United States Patent [19]

Lund

[11] Patent Number: 4,585,950
[45] Date of Patent: Apr. 29, 1986

[54] WIND TURBINE WITH MULTIPLE GENERATORS

[76] Inventor: Arnold M. Lund, 1210 Avocado Ave., Escondido, Calif. 92026

[21] Appl. No.: 678,838

[22] Filed: Dec. 6, 1984

[51] Int. Cl.⁴ ............................................. F03D 7/00
[52] U.S. Cl. ........................................ 290/44; 290/55
[58] Field of Search ...................... 290/44, 55; 322/17

[56] References Cited

U.S. PATENT DOCUMENTS

| | | | |
|---|---|---|---|
| 1,580,392 | 4/1926 | Wensley | 322/17 X |
| 3,942,026 | 3/1976 | Carter | 290/55 |
| 4,086,498 | 4/1978 | Szoeke | 290/55 |
| 4,140,433 | 2/1979 | Eckel | 290/55 X |

Primary Examiner—William M. Shoop, Jr.
Assistant Examiner—W. E. Duncanson, Jr.
Attorney, Agent, or Firm—Baker, Maxham & Jester

[57] ABSTRACT

Multiple induction type generators are drivingly connected to an impeller. As wind velocity increases, the generators are successively activated until all of the generators are operating at a maximum wind velocity. As the wind velocity decreases, the generators are successively de-activated until all of the generators are inoperative below a minimum wind velocity. Wind energy is more efficiently converted into electric power where impeller RPM must be maintained substantially constant under varying wind conditions to achieve the desired constant phase of the AC output.

13 Claims, 4 Drawing Figures

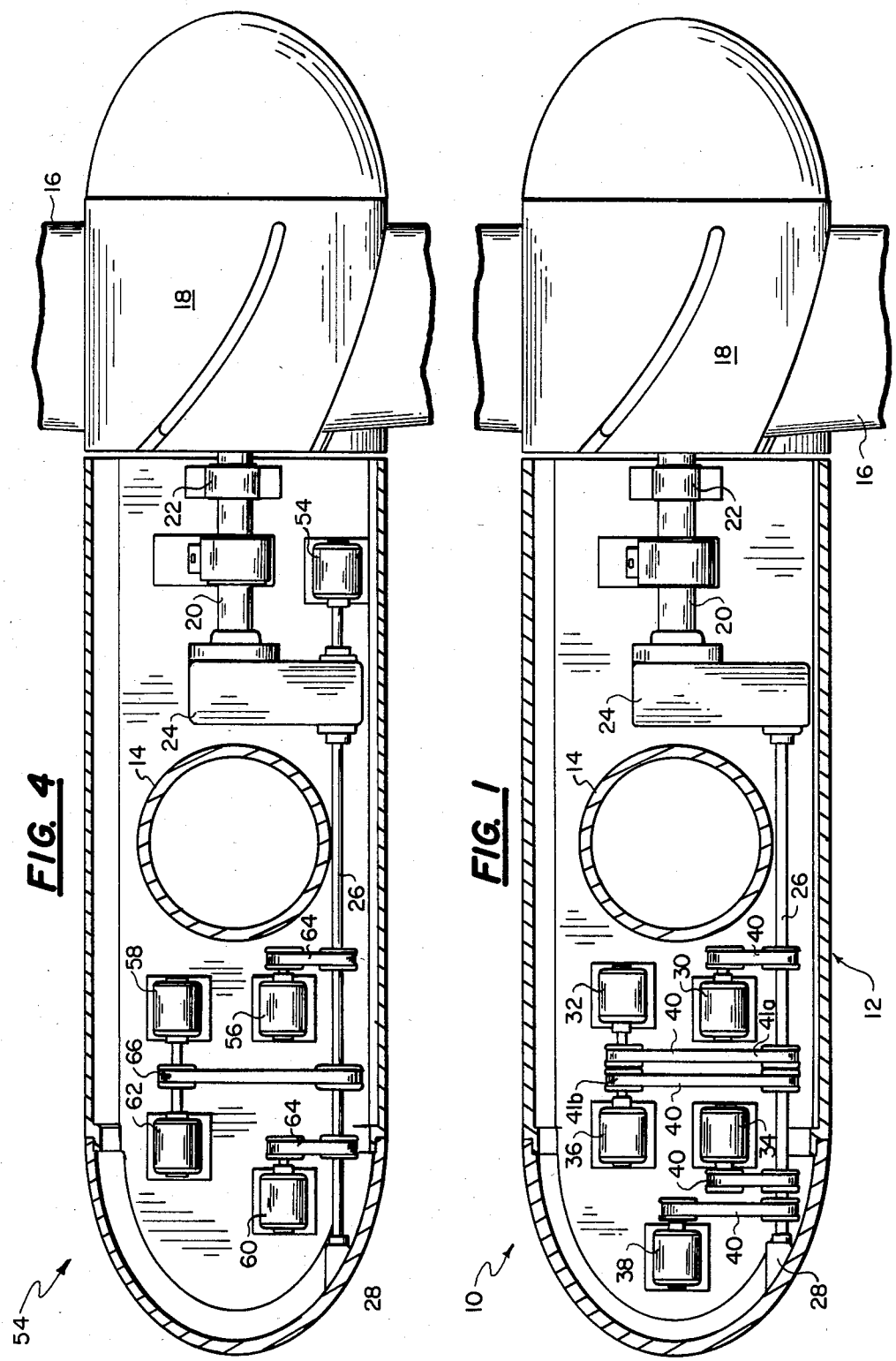

WIND TURBINE WITH MULTIPLE GENERATORS

BACKGROUND OF THE INVENTION

The present invention relates to electric power generating systems, and more particularly, to wind powered generating systems.

For centuries windmills have been used to harness the energy of the wind to grind wheat, operate water pumps and drive various other machines. More recently, wind powered turbines have been connected to generators for producing electric power.

The ever increasing cost of energy has lead to renewed interest in systems which generates electric power from the wind. Such systems are generally reliable, can be used in many locations, are an alternative to expensive fossil fuels, and are non-polluting. These factors make such systems particularly attractive as a partial solution to the energy crisis.

It is desirable for the output of a wind driven electric power generating system to have an AC output with a phase, such as sixty cycles per second, which is compatible with the phase of electric power supplied by utilities. This permits the output of the system to be directly used in the home with appliances, lights and other devices without the use of any DC to AC converters. Also, this enables the output of the wind driven system to be directly connected into the utility power grid. Because of this, most commercial systems for producing electric power from the wind utilize AC or induction type generators. DC generators are less desirable for wind driven systems because their brush structures undergo heavy wear and because electronic DC to AC power conversion circuitry is then required.

In order for an AC generator to provide electric current at a predetermined desired frequency, the input shaft of the generator must be driven at a substantially constant RPM. Therefore, such wind powered generating systems do not operate efficiently over a wide range of wind velocities. This problem can be partially solved by automatically varying the pitch of the blades, by using air brakes on the blades, by using governor mechanisms, and other devices. These devices allow the rotor of the generator to resist over spinning. Increased torque on the blades is translated into higher power output, rather than higher impeller RPM. However, the aforementioned approaches generally waste or ignore a large proportion of the wind energy which could otherwise be translated into electric power. One prior art wind turbine utilizes a small light load generator at low wind velocities and then switches over to a large, heavy load generator at high wind velocities. Both of the generators do not operate simultaneously and considerable efficiency is lost in stepping between a single small generator and a single large generator.

SUMMARY OF THE INVENTION

Accordingly, it is the primary object of the present invention to provide an improved wind powered system for more efficiently generating electric power under varying wind conditions.

It is another object of the present invention to provide an improved wind turbine capable of transforming a larger proportion of wind power into electric power over a wider range of wind velocities than conventional systems, without utilizing complex mechanical or electronic mechanisms.

According to the present invention, multiple induction type generators are drivingly connected to an impeller. As wind velocity increases, the generators are successively activated until all of the generators are operating at a maximum wind velocity. As the wind velocity decreases, the generators are successively deactivated until all of the generators are inoperative below a minimum wind velocity. Wind energy is more efficiently converted into electric power where impeller RPM must be maintained substantially constant under varying wind conditions to achieve the desired constant phase of the AC output.

BRIEF DESCRIPTION OF THE DRAWINGS

FIG. 1 is a simplified plan view of the mechanical components contained within the nacelle of a first embodiment of my invention.

FIG. 4 is a simplified plan view of the mechanical components contained within the nacelle of a second embodiment of my invention.

DESCRIPTION OF THE PREFERRED EMBODIMENTS

Figure 3:
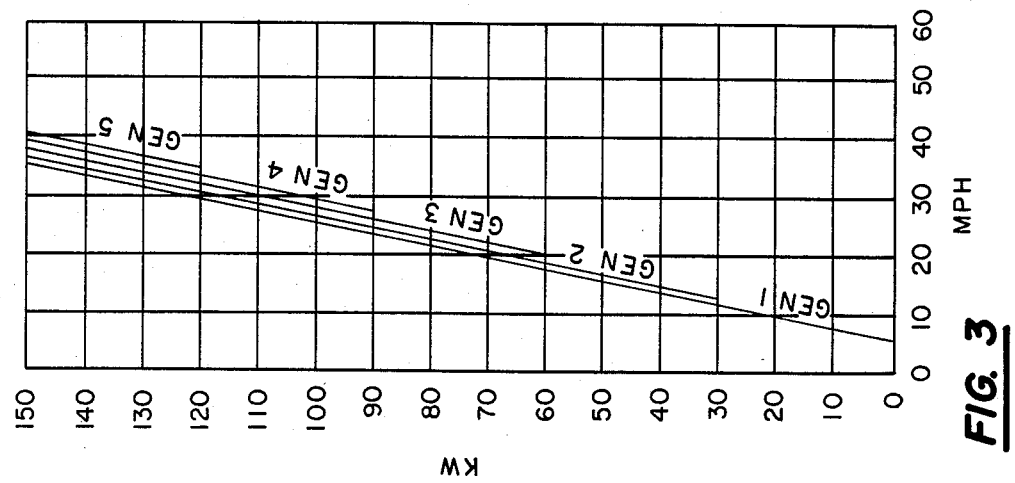
FIG. 3 is a graph depicting the operation of the generators of the first embodiment of my invention over a wide range of wind velocities.

The entire disclosure of my co-pending U.S. patent application Ser. No. 599,934 filed Apr. 13, 1984 entitled 'Wind Powered Generator' is specifically incorporated herein by reference. That application discloses a wind powered generator which utilizes an impeller with constant chord and progressive pitch blades configured according to a specific formula for maximum efficiency. It also discloses a supporting tower having an elevator for raising and lowering the nacelle, and a special foundation structure for the tower. The system disclosed in that application includes a three phase commutating generator which is driven by the impeller. A servo circuit adjusts movable brushes in the generator to cause it to produce the maximum electric power output with a constant impeller RPM and a phase compatible with the utility power grid. The invention described herein is an alternate approach to the invention of my Ser. No. 599,934 invention for more efficiently generating electric power over a wide range of wind velocities.

Referring to FIG. 1, a first embodiment 10 of my wind powered generator includes a nacelle 12 mounted about the upper end of a cylindrical tower 14 for rotation about a vertical axis. An impeller having a plurality of blades 16 is mounted at the aft end of the nacelle for rotation about a horizontal axis. The blades 16 are bolted to a splined hub 18 mounted over the aft end of a shaft 20. This arrangement of nacelle, tower and impeller insures that the nacelle will 'weather vane' or rotate so that the longitudinal axis of the nacelle is substantially parallel to the direction of the wind. Thus, the impeller blades 16 extend substantially perpendicular to the direction of the wind, for most efficient extraction of wind energy. The forward end of the nacelle is tapered or streamlined as is conventional.

Referring still to FIG. 1, the intermediate portion of the shaft 20 is rotatably journaled in a pillow block 22. The forward end of the shaft 20 is drivingly connected to a gear reduction mechanism 24 which in turn drives a shaft 26 at a higher RPM than the shaft 20. The forward end of the shaft 26 is journaled in another pillow block 28. A significant feature of my invention is that the nacelle is balanced on either side of the tower 14. As illustrated in FIG. 1, the impeller and gear reduction mechanism are mounted inside the nacelle 12 on one side of the tower 14. A plurality of induction type generators 30, 32, 34, 36 and 38 are mounted inside the nacelle on the other side of the tower 14. The drive shaft 26 straddles or bypasses the tower 14 on one side thereof for drivingly connecting the impeller and the generators.

In the first embodiment 10 of my invention, each of the generators is designed to operate at the same rotational speed, for example 1800 RPM. Also, each of the generators is designed to produce approximately the same maximum electric power output (sixty cycles AC), for example thirty kilowatts. The rotors of each of the generators are drivingly connected to the shaft 26 by respective endless timing belts 40. Each belt 40 is entrained at one end about a pulley 41a on the input shaft of the corresponding generator and at the other end about a pulley 41b mounted on the drive shaft 26. Thus, there is a positive driving connection between the impeller and the rotors of each of the five generators. In the first embodiment of my invention, the pulleys are all of equal size so that the rotors of all five generators are driven at the same RPM.

Figure 2:
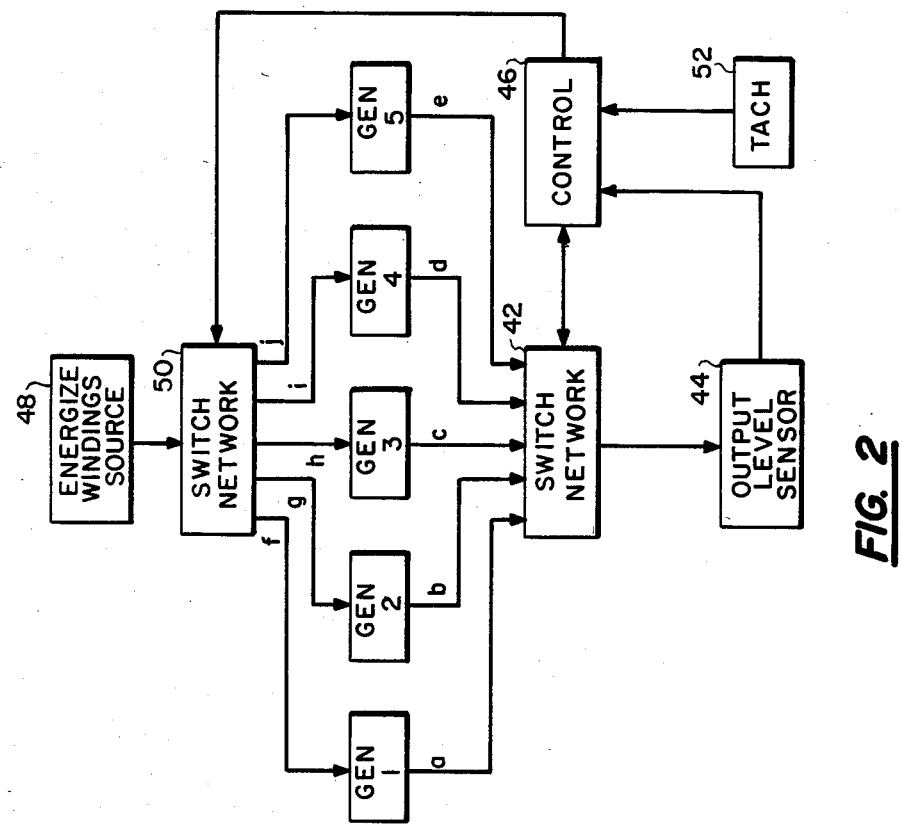
FIG. 2 is a block diagram illustrating the manner in which the generators of the first embodiment of my invention are controlled.

The operation of the first embodiment 10 of my wind powered generator will now be described in conjunction with FIG. 2. The generators 30, 32, 34, 36 and 38 are illustrated in FIG. 2 as GEN 1, GEN 2, GEN 3, GEN 4, and GEN 5. The power output of the generators is fed on lines a, b, c, d and e through a first switch network 42 to an output level sensor circuit 44. A control circuit 46 commands the first switch network 42 to selectively feed the output of one of the generators to the output level sensor circuit 44. The control circuit 46 commands the first switch network 42 based upon information received from the output level sensor circuit 44. The induction generators are of the conventional type in that power will be generated only if the stator or rotor windings are energized. A source of power 48 for energizing the windings is connected through a second switch network 50 and through lines f, g, h, i and j to each of the generators. The control circuit 36 commands the second switch network 50 to selectively connect the power source 48 to one or more of the generators, or to disconnect the power source 48 from all the generators. The control circuit 46 also receives information regarding the impeller RPM from a tachometer 52.

The manner in which the control circuit 46 (FIG. 2) commands the first and second switch networks 42 and 50 will now be described in conjunction with FIGS. 2 and 3. When the wind velocity exceeds a predetermined minimum, for example approximately seven miles per hour, the control circuit 46 commands the second switch network 50 to energize the windings of the first generators. The predetermined minimum wind velocity will rotate the impeller at a corresponding desired RPM which is sensed by the control circuit 46 through the tachometer 52. Thus, the first generators produces electric power. The control circuit 46 commands the first switch network 42 to feed the electric power from the first generator to the output lever sensor circuit 44.

As the velocity of the wind increases, eventually the electric power output of the first generator will begin to exceed its capacity. This is determined by the control circuit 46 by monitoring signals from the output level sensor circuit 44. When the recommended output level of the first generator is exceeded by a certain amount, for example one kilowatt, the control circuit 46 commands the second switch network 50 to energize the windings of the second generator in addition to the windings of the first generator. The first generator is not deactivated. At the same time, the control switch 46 commands the first switch network 42 to feed the electric power output of the second generator to the output level sensor circuit 44. Only the output of the second generator is fed to the output level sensor, and not the output of the first generator.

As illustrated in FIG. 3, the second generator may cut in at a wind velocity of approximately twelve miles per hour. In a similar fashion, as the wind velocity increases, the control circuit 46 monitors the amount of electric power produced by the second generator and activates the third, fourth and fifth generators in succession at approximately twenty miles per hour, twenty-seven miles per hour and thirty-three miles per hour, respectively. Thus, all of the generators are activated when the wind velocity exceeds a predetermined maximum, which in the illustrated example is approximately thirty-three miles per hour.

As the wind velocity decreases, the generators are successively de-activated, one at a time. For example, when the control circuit 46 determines that the output of the fifth generator has dropped below its rated capacity by a predetermined amount, for example five kilowatts, it commands the second switch network 50 to de-activate the windings of the fifth generator. This occurs when the wind velocity drops below approximately thirty-three miles per hour in the illustrated example as indicated in the graph of FIG. 5. Similarly, when the wind velocity drops below approximately twenty-seven miles per hour, the fourth generator is de-activated. The third, second and first generators are de-activated in succession when the wind velocity drops below approximately twenty miles per hour, twelve miles per hour and seven miles per hour, respectively. Thus, when the wind velocity is below a predetermined minimum, which is approximately seven miles per hour in the illustrated example, all of the generators are de-activated and the impeller idles at a low speed.

It should be understood that in some situations the wind velocity may increase only enough for the first, second and third generators to cut-in at which time the wind velocity will begin to decrease. As the wind velocity decreases, then the third, second and first generators will be successively de-activated. The system may not ramp all the way through all the generators and may, for example, fluctuate between a state in which three of the generators are operating and four of the generators are operating. This would occur in the illustrated example if the wind velocity fluctuated between approximately twenty-five miles per hour and thirty miles per hour.

It will be observed that in the first embodiment of my invention the weight of the impeller and the gear reduction mechanism mounted in the nacelle on one side of the tower is balanced by the weight of the five generators mounted in the nacelle in the other side of the tower. This facilitates rotation of the nacelle around the tower as the direction of the wind changes and reduces the stress on the bearing structures rotatably mounting the nacelle to the tower.

FIG. 4 illustrates a second embodiment 54 of my invention. It is similar to the first embodiment except that one generator 54 of the five generators is connected to the aft end of the drive shaft 26. Also, the five generators 54, 56, 58, 60 and 62 have different rated power outputs and are designed to operate at different RPMs. For example, the generator 54 may be rated at ten kilowatts at 1200 RPM. The generator 56 may be rated at thirty kilowatts at 1200 RPM. The generator 58 may be rated at forty kilowatts at 1800 RPM. The generator 60 may be rated at twenty kilowatts at 1200 RPM. And finally the generator 62 may be rated at twenty kilowatts at 1800 RPM. The gear reduction mechanism 24 has a ratio such that when the impeller is rotating at its constant preferred RPM, the input shaft of the first generator 54 will be driven at 1200 RPM. Pulleys of equal diameter and associated drive belts 64 are then used to drivingly connect the shaft 26 with the input shafts of the generators 56 and 60, which are also driven at 1200 RPM. Different size pulleys are then used with a drive belt 66 in drivingly connecting the input shafts of the generators 58 and 62 with the shaft 26 so that these last generators will be driven at 1800 RPM when the other generators are driven at 1200 RPM. The generators of my second embodiment are successively activated as the wind velocity increases and are successively de-activated as the wind velocity decreases in the same manner as described in conjunction with the first embodiment of my invention.

Having described preferred embodiments of my wind powered generator, it should be apparent to those skilled in the art that my invention may be modified in both arrangement and detail. Therefore, the protection afforded my invention should only be limited in accordance with the scope of the following claims.

I claim:

1. A wind powered generator comprising:
   an impeller;
   means for supporting the impeller for rotation by the wind;
   a plurality of generators each having an input shaft;
   means providing a continuous driving connection between the impeller and the input shaft of each of the generators for continuous co-rotation thereof; and
   control means responsive to wind velocity for successively activating the generators as the wind velocity increases and for successively de-activating the generators as the wind velocity decreases.

2. A wind powered generator according to claim 1 wherein said plurality of generators is greater than two.

3. A wind powered generator according to claim 1 wherein said control means activates the generators by energizing windings therein.

4. A wind powered generator according to claim 2 wherein at least two of the generators have different power output levels when they activated.

5. A wind powered generator according to claim 2 wherein at least two of the generators operate at different RPMs and the driving connection means includes drive ratio means for enabling the two generators to be simultaneously driven at their different operating RPMs by the impeller.

6. A wind powered generator according to claim 1 and further comprising:
   a nacelle housing the generators and the driving connection means;
   a vertical support tower extending through the nacelle; and,
   means for mounting the nacelle for rotation about the tower for orientation into the wind.

7. A wind powered generator according to claim 6 wherein the impeller is mounted at one end of the nacelle on one side of the tower, the generators are mounted in the nacelle on the other side of the tower, and the driving connection means extends within the nacelle around the tower, so that the nacelle is balanced for rotation about the tower.

8. A wind powered generator according to claim 7 wherein at least one of the generators is mounted in the nacelle on the one side of the tower and the remaining generators are mounted in the nacelle on the other side of the tower.

9. A wind powered generator comprising:
   an impeller;
   means for supporting the impeller for rotation by the wind;
   a plurality of generators each having an input shaft;
   transmission means for providing a continuous driving connection between the impeller and the input shaft of each of the generators for continuous co-rotation thereof; and
   control means responsive to wind velocity for activating a first one of the generators when the wind velocity exceeds a predetermined minimum, for successively activating additional ones of the generators as the wind speed increases until all of the generators are activated when the wind velocity exceeds a predetermined maximum, for de-activating a first one of the generators when the wind velocity falls below the predetermined maximum, and for successively de-activating additional ones of the generators as the wind velocity decreases until all of the generators are de-activated when the wind velocity is below the predetermined minimum.

10. A wind powered generator according to claim 9 wherein said control means activates the generators by energizing windings therein.

11. A wind powered generator according to claim 9 wherein at least two of the generators have different power output levels when they are activated.

12. A wind powered generator according to claim 9 wherein at least two of the generators operate at different RPMs and the driving connection means includes drive ratio means for enabling the two generators to be simultaneously driven at their different operating RPMs by the impeller.

13. A wind powered generator comprising:
   an impeller;
   means for supporting the impeller for rotation by the wind;
   a plurality of generators each having an input shaft;
   transmission means for providing a continuous driving connection between the impeller and the input shaft of each of the generators for continuous co-rotation thereof; and
   control means responsive to wind velocity for selectively and simultaneously activating one or more of the generators for maximizing the amount of electric power produced under varying wind velocities while maintaining a substantially constant impeller RPM.

* * * * *